Nov. 21, 1961    P. WHEELER    3,009,313
CHAIN LINK CONNECTING APPARATUS
Filed Feb. 18, 1958
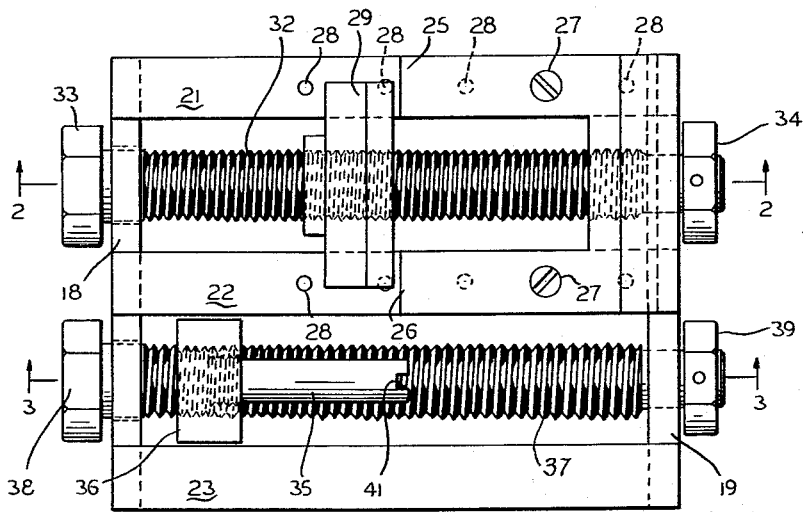
Fig. 1
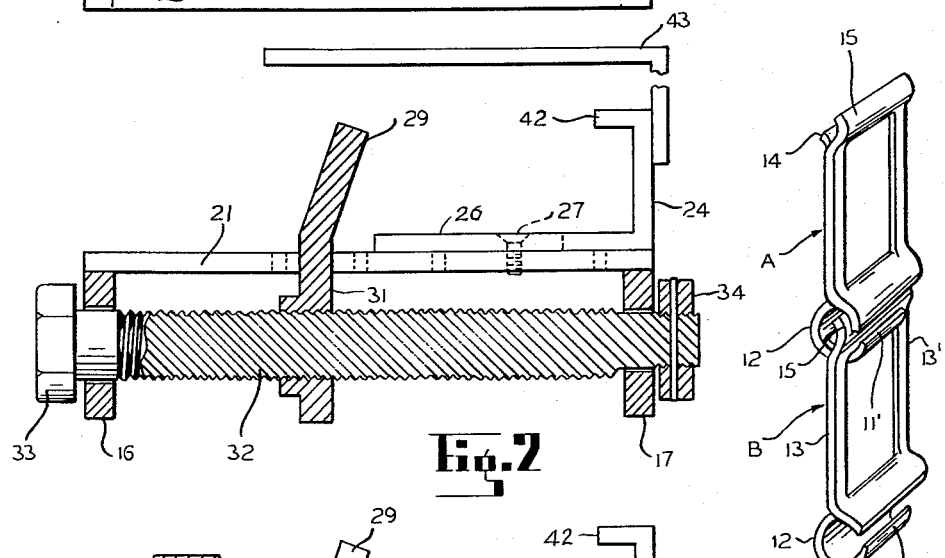
Fig. 2
Fig. 4
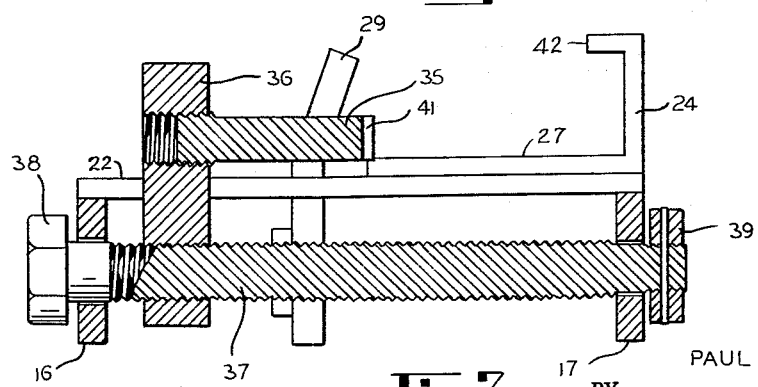
Fig. 3
INVENTOR.
PAUL WHEELER
BY
Frank J. Foley
ATTORNEY

United States Patent Office 3,009,313
Patented Nov. 21, 1961

3,009,313
CHAIN LINK CONNECTING APPARATUS
Paul Wheeler, Na-Au-Say Township, Kendall County, Ill.
(R.R. 1, Box 82, Minooka, Ill.)
Filed Feb. 18, 1958, Ser. No. 715,924
4 Claims. (Cl. 59—7)

This invention relates to an improvement in apparatus for connecting and disconnecting steel sprocket chain links of the type in which each link, of generally rectangular shape, has a transverse slotted hinge sleeve at one end and a transverse pintle at its opposite end.

To engage the pintle of one such link with the sleeve of the next adjacent link, it is necessary to force one side bar of one link laterally through the slot of the sleeve, expanding the slot, as the pintle simultaneously enters the cylindrical recess in the sleeve. Links of this type are extensively used in farm machinery, and the operation of connecting or disconnecting such links must often be done in the field and very frequently in cramped quarters. Due to these and other conditions, as well as the difficulty of temporarily expanding the slot, these operations have long been recognized as difficult, time consuming, and the source of numerous injuries to person and equipment. Despite numerous and skilled prior efforts to solve the problem with an efficient device, it is not believed that a satisfactory device has heretofore been produced.

The general object of this invention is to provide an apparatus which can be used conveniently and efficiently in field or shop for the above-mentioned operations.

Another object of the invention is to provide an apparatus which can be adjusted to operate on links of all the many sizes which are commonly in commercial use.

Various other objects and advantages peculiar to my invention will be mentioned hereinafter or will become apparent from a perusal of this specification.

A preferred embodiment of the invention is herein illustrated and described. However, it should be understood that the invention is not limited to the details of such emmodiment, but embraces variations and modifications coming within the scope of the appended claims.

In the drawing,
FIGURE 1 is a top plan view of the apparatus.
FIGURE 2 is a vertical sectional view on the line 2—2 of FIGURE 1.
FIGURE 3 is a vertical sectional view on the line 3—3 of FIGURE 1.
FIGURE 4 is a perspective view of a pair of typical chain links hinged together.

Referring now to the drawing, the sprocket chain herein involved has been a familiar article in industry for decades and needs no detailed description herein. But is worthwhile to observe here that the chain manufacturers usually so proportion the laterally extending slot 11 in the hinge sleeve 12 that a large amount of force is required to enable a side bar such as 13 of one link to expand the slot temporarily and slide through it during the connecting or disconnecting of a pair of links, as the pintle is being inserted into or removed endwise from the sleeve. In FIGURE 4 is shown a pintle consisting of two curved flanges 14 and 15, which is a conventional and well-known design.

The apparatus of my invention, to be used for connecting or disconnecting these chain links, is provided with a frame which may consist of the following parts. The vertical end members 16 and 17 may be steel plate, and on their upper edges 18 and 19 are welded three longitudinal bars 21, 22 and 23.

An adjustable vise is provided for holding rigidly one link while another link is being connected thereto or disconnected. This vise comprises a stationary jaw 24, which is integral with and extends upwardly from a bifurcated mounting plate having arms 25 and 26 by means of which it may be secured in any one of several longitudinally spaced positions by counter-sunk screws 27, which can be screwed into suitable holes such as 28, provided therefor in the bars 21 and 22.

The movable jaw consists of the inclined member 29 having a vertical portion 31 of lesser width extending downwardly between the guide bars 21 and 22 and threadedly engaged with the screw 32, one end of which is rotatably mounted, as shown in FIGURE 2, in the end member 17, while its other end is rotatably mounted in the end member 16. One end of this screw carries an integral nut 33, while the other end is provided with a nut 34 threaded and pinned thereon. The operator may grip with a wrench either nut for rotating the screw to close or open the vise.

To use the device for disconnecting a pair of links one from the other, a link such as A is laid flat or nearly so upon the mounting plate 25—26 and the movable vise jaw 29 is advanced against it to clamp this link tightly between the jaws 29 and 24. In locating the link A in the vise, the axis of the hinge sleeve of link A will be aligned with the pin 35.

The pin 35 is threaded on its enlarged end portion to be engaged, as shown, with an upright propeller block 36, which is laterally guided by the bars 22 and 23, and threadedly engaged with the screw 37. Pin 35 may be screwed into block to any extent desired. The screw 37, like the screw 32, is rotatably mounted and supported in the frame members 16 and 17 and carries an integral nut 38 on one end, and a detachable pinned nut 39 on its other end. The operator may apply his wrench to either nut to propel block 36.

The operator, having locked the vise, may transfer his wrench to the head 38 of screw 37 and rotate the latter to advance the pin 35 toward the link B which is to be disconnected. At this time the operator will rotate link B to an angle extending about 45° upwardly from the plane of the link lying on the mounting plate in the vise to place the side bar 13 of link B in alignment with the ends of slot 11'. He will then advance the block 36 by means of the screw until the slot 41 in pin 35 embraces the flange 15 of the pintle of link B. The operator will then further advance the block 36, whereupon the pin 35 will grip and propel the pintle longitudinally through the slotted hinge sleeve of link A, while the side bar 13 will enter the end of slot 11' and force the slot to expand. Continued rotation of screw 37 will eventually cause the side bar 13 to pass entirely through and out of the slot and thereby disengage link B from link A.

This apparatus may also be used for connecting link B with link A. First link A is locked in the vise with its hinge sleeve axis in alignment with the center of pin 35. The block 36 is backed away from the vise, the slot 41 in pin 35 will be again caused to embrace flange 15 of the pintle of chain link B, and the link will be advanced toward link A, again inclined upwardly at the previously described angle, to cause the side bar 13' of link B to enter slot 11' as the pintle is propelled into the hinge sleeve. This operation is continued until the two links are completely engaged for hinging action.

The longitudinal adjustability of the vise jaw 24 is advantageous for a number of reasons, including the fact that in some cramped quarters, where a chain is already on the sprockets and lies close to an adjoining part of the machinery, there would not be enough clearance to the right of jaw 24, as FIGURE 2 is viewed, to force a link such as link B to the right far enough to disengage it from link A. Hence, before attempting this operation, the screws 27 would be unscrewed and the vise jaw 24 moved to the left, and the screws reset in others of the holes 28. These threaded holes 28 may be as numerous and as closely spaced as may be desired.

As is well understood in this art, chain links come in many sizes and thicknesses and this apparatus may be so dimensioned as to accommodate itself to all of the chain link sizes which are commonly encountered. Nevertheless, the overall dimensions of the device may easily be kept to a minimum so that this device may be placed in position for connecting or disconnecting sprocket chains in most any restricted space encountered on farm machinery.

As an added convenience, I prefer to provide a lateral flange 42 at the top of vise jaw 24, so that when the apparatus is about to be engaged with a sprocket chain on a machine, it may be temporarily hung on the chain by means of the flange 42. Also, if desired a handle 43 may be welded to the vise jaw 24 to facilitate holding the apparatus while a wrench is being used thereon.

Because of interference by adjacent machinery parts I provide that either screw 32 or 37 may be rotated from either end.

In view of the fact that there are very substantial size differences in chain links, I may use pintle propelling pins 35 of different diameters and different lengths, but all of these may be threaded at one end to engage the same sized threaded hole in the block 36. Any pin may be connected to the block so that it extends to the left in FIGURE 3, if desired, to propel a pintle to the left.

The foregoing described apparatus provides a number of advantages which will be appreciated by users. The adjustable vise can be moved to various positions to very firmly grip one link of the chain, and to hold that link with its hinge sleeve axis, concentric with the pin 35. I have found that the inclined jaws 29 materially aids the vise in gripping the link side bars. The link thus gripped must be held firmly and absolutely stationary in order to facilitate a fast operation and which will not bend or otherwise damage either link.

Engaging the slotted pin 35 with the pintle as herein described serves not only to accurately propel the pintle out of or into the adjoining hinge sleeve, but at the same time it holds the angled chain link at the proper angular position for perfect alignment with the slot 11, thus avoiding bending or otherwise damaging either link.

It should be understood that this invention is susceptible of some variation and modification differing from the illustrated embodiment yet remaining within the scope of the appended claims.

Having shown and described my invention, I claim:

1. Chain link connecting and disconnecting apparatus comprising a rigid frame, a screw rotatably and substantially axially immovably mounted on said frame extending longitudinally thereof, a vise having one stationary jaw extending upwardly from said frame, a movable vise jaw threadedly connected with the screw extending upwardly therefrom in a position opposing said stationary jaw and propellable by said screw positively toward and away from the stationary jaw, whereby said vise is adapted for compressively gripping the opposing side bars of a link edgewise of the plane of the link, a second screw rotatably and substantially axially immovably mounted on the frame parallel to the first screw and spaced laterally apart therefrom, a member threadedly engaged with the second screw upstanding therefrom in the same direction as said jaws and propellable by said second screw, a pintle gripping pin having a bifurcated end providing a slot adapted for embracing a flange portion of a chain link pintle, the pin being positioned and having a diameter proportioned for longitudinally entering the slotted sleeve of a chain link gripped by said vise, said pin being rotatably supported on said member and adapted to be propelled thereby, and means for rotating said screws.

2. Chain link connecting and disconnecting apparatus comprising a rigid frame, a screw rotatably and substantially axially immovably mounted on said frame extending longitudinally thereof, a vise having one stationary jaw extending upwardly from said frame, a movable vise jaw threadedly connected with the screw extending upwardly therefrom in a position opposing said stationary jaw and propellable by said screw positively toward and away from the stationary jaw, whereby said vise is adapted for compressively gripping the opposing side bars of a link edgewise of the plane of the link, means for laterally guiding the movable jaw, a second screw rotatably and substantially axially immovably mounted on the frame parallel to the first screw and spaced laterally apart therefrom, a member threadedly engaged with the second screw upstanding therefrom in the same direction as said jaws and propellable by said second screw, means for laterally guiding said member, a pintle gripping pin having a bifurcated end providing a slot adapted for embracing a flange portion of a chain link pintle, the pin being positioned and having a diameter proportioned for longitudinally entering the slotted sleeve of a chain link gripped by said vise, said pin being rotatably supported on said member and adapted to be propelled thereby, and means for rotating said screw.

3. Chain link connecting and disconnecting apparatus comprising a rigid frame, a screw rotatably and substantially axially immovably mounted on the under side of said frame extending longitudinally thereof, a vise having one stationary jaw extending upwardly from said frame, a movable vise threadedly connected with the screw extending upwardly therefrom in a position opposing said stationary jaw and propellable thereby positively toward and away from the stationary jaw, whereby said vise is adapted for compressively gripping the opposite side bars of a link edgewise of the plane of the link, a second screw rotatably and substantially axially immovably mounted on the frame parallel to the first screw and spaced laterally apart therefrom, a member threadedly engaged with the second screw upstanding therefrom in the same direction as said jaws and propellable by said second screw, a pintle gripping pin having a bifurcated end providing a slot adapted for embracing a flange portion of a chain link pintle, the pin being positioned and having a diameter proportioned for longitudinally entering the slotted sleeve of a chain link gripped by said vise, said pin being rotatably supported on said member and adapted to be propelled thereby, and means for rotating said screws.

4. Chain link connecting and disconnecting apparatus comprising a rigid frame, a screw rotatably and substantially axially immovably mounted on said frame extending longitudinally thereof, a vise having one stationary jaw extending upwardly from said frame, a movable vise jaw threadedly connected with the screw extending upwardly therefrom in a position opposing said stationary jaw and propellable thereby positively toward and away from the stationary jaw, whereby said vise is adapted for compressively gripping the opposite side bars of a link edgewise of the plane of the link, a second screw rotatably and substantially axially immovably mounted on the frame parallel to the first screw and spaced laterally apart therefrom, a member threadedly engaged with the second screw upstanding therefrom in the same direction as said jaws and propellable by said second screw, a pintle gripping pin having a bifurcated end providing a slot adapted for embracing a flange portion of a chain link pintle, the pin being positioned and having a diameter proportioned for longitudinally entering the slotted sleeve of a chain link gripped by said vise, said pin being rotatably supported on said member and adapted to be propelled thereby, means for selectivity positioning the stationary vise jaw at any of several longitudinally spaced positions on said frame, and means for rotating said screws.

References Cited in the file of this patent

UNITED STATES PATENTS

| | | | |
|---|---|---|---|
| 1,111,103 | Shields | Sept. 22, | 1914 |
| 1,696,578 | Lippert | Dec. 25, | 1928 |
| 2,379,001 | Hage | June 26, | 1945 |
| 2,397,513 | Smith | Apr. 2, | 1946 |
| 2,444,450 | Kellgren | July 6, | 1948 |
| 2,645,962 | Zahner | July 21, | 1953 |
| 2,697,462 | Connor | Dec. 21, | 1954 |
| 2,884,225 | Ford | Apr. 28, | 1959 |
| 2,917,893 | Kausche | Dec. 22, | 1959 |

FOREIGN PATENTS

| | | | |
|---|---|---|---|
| 917,700 | France | Sept. 23, | 1946 |
| 471,597 | Canada | Feb. 20, | 1951 |